(12) United States Patent
Zhao et al.

(10) Patent No.: US 11,792,391 B2
(45) Date of Patent: Oct. 17, 2023

(54) NEURAL NETWORK BASED COEFFICIENT SIGN PREDICTION

(71) Applicant: TENCENT AMERICA LLC, Palo Alto, CA (US)

(72) Inventors: Xin Zhao, Palo Alto, CA (US); Yixin Du, Palo Alto, CA (US); Liang Zhao, Palo Alto, CA (US); Madhu Peringassery Krishnan, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/494,238

(22) Filed: Oct. 5, 2021

(65) Prior Publication Data

US 2022/0124311 A1 Apr. 21, 2022

Related U.S. Application Data

(63) Continuation of application No. 17/071,582, filed on Oct. 15, 2020, now Pat. No. 11,190,760.

(51) Int. Cl.
*H04N 19/105* (2014.01)
*H04N 19/176* (2014.01)
*G06N 3/08* (2023.01)
*H04N 19/129* (2014.01)
*H04N 19/132* (2014.01)

(52) U.S. Cl.
CPC ............ *H04N 19/105* (2014.11); *G06N 3/08* (2013.01); *H04N 19/129* (2014.11); *H04N 19/132* (2014.11); *H04N 19/176* (2014.11)

(58) Field of Classification Search
None
See application file for complete search history.

(56) References Cited

U.S. PATENT DOCUMENTS

| 6,678,421 | B1 | 1/2004 | Daniell et al. | |
|---|---|---|---|---|
| 2018/0249158 | A1* | 8/2018 | Huang | H04N 19/46 |
| 2019/0208225 | A1* | 7/2019 | Chen | H04N 19/18 |
| 2021/0067807 | A1 | 3/2021 | Lainema | |
| 2022/0286695 | A1* | 9/2022 | Li | H04N 19/176 |

OTHER PUBLICATIONS

Mao, "Convolutional Neural Network Based Bi-Prediction Utilizing Spatial and Temporal Information in Video Coding", IEEE Transactions on Circuits and Systems for Video Technology, vol. 30, Iss. 7, Jul. 2020. (Year: 2020).*
Dong Liu et al., "Deep Learning-Based Technology in Responses to the Joint Call for Proposals on Video Compression with Capability beyond HEVC", IEEE Transactions on Circuits and Systems for Video Technology, 2019, 14 pages, vol. 30 , Issue 5.

(Continued)

*Primary Examiner* — Chikaodili E Anyikire
(74) *Attorney, Agent, or Firm* — Sughrue Mion, PLLC

(57) ABSTRACT

A method, computer program, and computer system is provided for coding video data. Reference samples and magnitudes of transform coefficients corresponding to a current block of video data from an input to a neural network are identified. Sign values associated with the transform coefficients are predicted based on at least the identified reference samples. The video data is encoded/decoded based on the predicted sign values.

20 Claims, 11 Drawing Sheets

(56) References Cited

OTHER PUBLICATIONS

Yingbin Wang et al., "CE13: Dense Residual Convolutional Neural Network based In-Loop Filter (Test 2.2 and 2.3)", Joint Video Experts Team (JVET) of ITU-T SG 16 WP 3 and ISO/IEC JTC 1/SC 29/WG 11, Mar. 2019, 6 pages, JVET-N0254-v2.
Yiming Li et al., "Methodology and reporting template for neural network coding tool testing", Joint Video Experts Team (JVET) of ITU-T SG 16 WP 3 and ISO/IEC JTC 1/SC 29/WG 11, Jan. 2019, 4 pages, JVET-M1006-v1.
Jonathan Pfaff et al., "Intra prediction modes based on neural networks", Joint Video Experts Team (JVET) of ITU-T SG 16 WP 3 and ISO/IEC JTC 1/SC 29/WG 11, Apr. 2018, 14 pages, JVET-J0037-v1.
Shan Liu et al., "JVET AHG report: Neural Networks in Video Coding (AHG9)", Joint Video Experts Team (JVET) of ITU-T SG 16 WP 3 and ISO/IEC JTC 1/SC 29/WG 11, Apr. 2018, 3 pages, JVET-J0009-v1.
Lulu Zhou et al., "Convolutional Neural Network Filter (CNNF) for intra frame", Joint Video Exploration Team (JVET) of ITU-T SG 16 WP 3 and ISO/IEC JTC 1/SC 29/WG 11, Jan. 2018, 9 pages, JVET-I0022.
International Search Report dated Sep. 24, 2021 in Application No. PCT/US2021/047999.
Written Opinion of the International Searching Authority dated Sep. 24, 2021 in Application No. PCT/US2021/047999.

\* cited by examiner

NEURAL NETWORK BASED COEFFICIENT SIGN PREDICTION

CROSS-REFERENCE TO RELATED APPLICATIONS

This application is a continuation of U.S. application Ser. No. 17/071,582, filed Oct. 15, 2020.

FIELD

This disclosure relates generally to field of data processing, and more particularly to video encoding and decoding.

BACKGROUND

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors.

Deep learning is a set of learning methods attempting to model data with complex architectures combining different non-linear transformations. The elementary bricks of deep learning are the neural networks, which are combined to form the deep neural networks. An artificial neural network is an application, non-linear with respect to its parameters θ that associates to an entry x and an output y=f(x, θ). The parameters θ are estimated from a learning sample. The neural networks can be used for regression or classification. There exist several types of architectures of neural networks.

SUMMARY

Embodiments relate to a method, system, and computer readable medium for coding video data. According to one aspect, a method for coding video data is provided. The method may include identifying reference samples and transform coefficients corresponding to a current block of video data. Reference samples and magnitudes of transform coefficients corresponding to a current block of video data from an input to a neural network are identified. Sign values associated with the transform coefficients are predicted based on at least the identified reference samples. The video data is encoded/decoded based on the predicted sign values.

According to another aspect, a computer system for coding video data is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include identifying reference samples and transform coefficients corresponding to a current block of video data. Reference samples and magnitudes of transform coefficients corresponding to a current block of video data from an input to a neural network are identified. Sign values associated with the transform coefficients are predicted based on at least the identified reference samples. The video data is encoded/decoded based on the predicted sign values.

According to yet another aspect, a computer readable medium for coding video data is provided. The computer readable medium may include one or more computer-readable storage devices and program instructions stored on at least one of the one or more tangible storage devices, the program instructions executable by a processor. The program instructions are executable by a processor for performing a method that may accordingly include identifying reference samples and transform coefficients corresponding to a current block of video data. Reference samples and magnitudes of transform coefficients corresponding to a current block of video data from an input to a neural network are identified. Sign values associated with the transform coefficients are predicted based on at least the identified reference samples. The video data is encoded/decoded based on the predicted sign values.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to video encoding and decoding. The following described exemplary embodiments provide a system, method and computer program to, among other things, code video data based on predicting sign values of transform coefficients of the video data. Therefore, some embodiments have the capacity to improve the field of computing by improving coding efficiency based on using neural network to predict signs of transform coefficients of video data.

As previously described, deep learning is a set of learning methods attempting to model data with complex architectures combining different non-linear transformations. The elementary bricks of deep learning are the neural networks, which are combined to form the deep neural networks. An artificial neural network is an application, non-linear with respect to its parameters θ that associates to an entry x and an output y=f(x, θ). The parameters θ are estimated from a learning sample. The neural networks can be used for regression or classification. There exist several types of architectures of neural networks. However, deep neural networks have only been used for loop filtering and intra-frame prediction. It may be advantageous, therefore, to use neural networks for sign prediction in order to improve coding efficiency.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Figure 1:
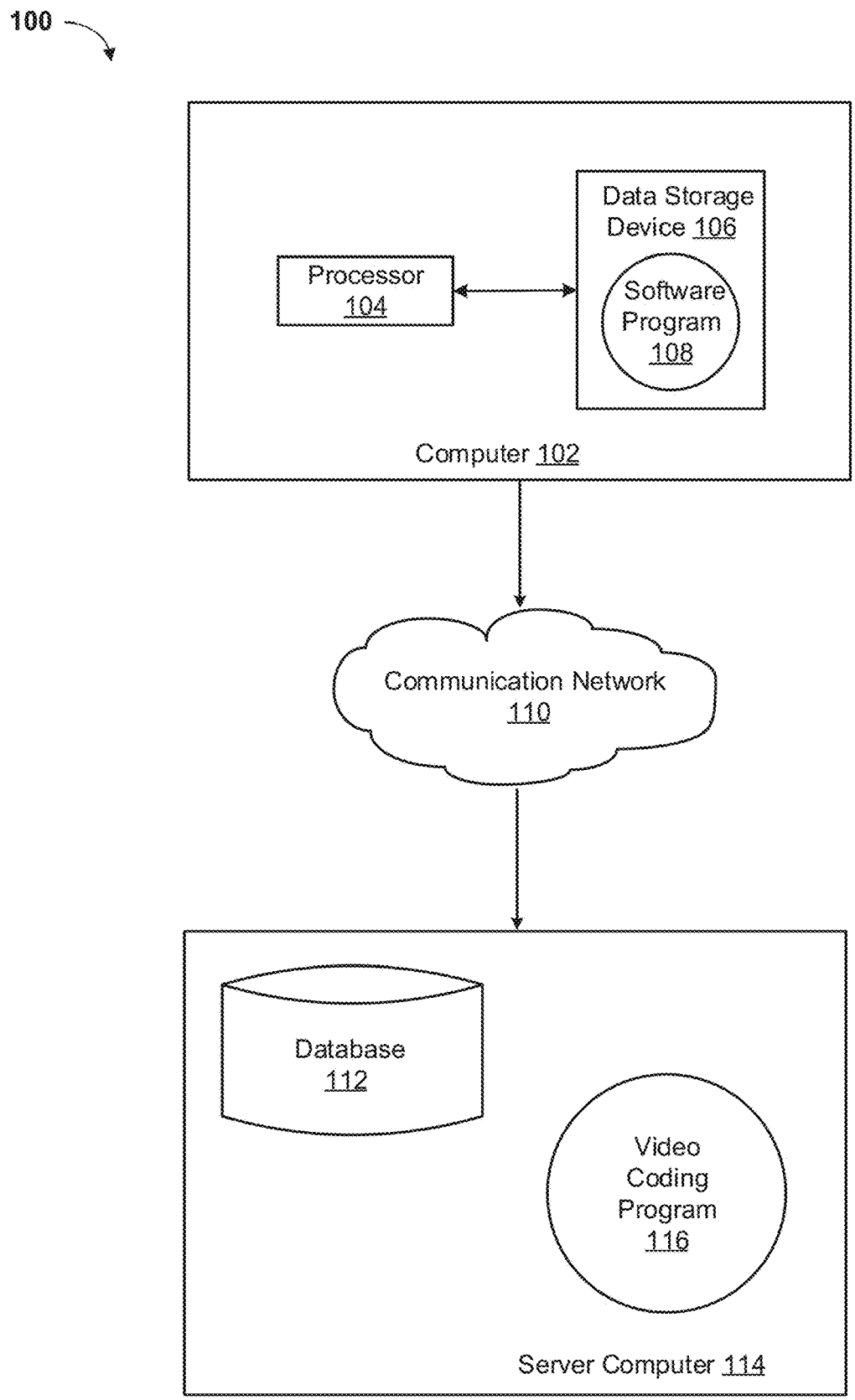
FIG. 1 illustrates a networked computer environment according to at least one embodiment.

Referring now to FIG. 1, a functional block diagram of a networked computer environment illustrating a video coding system 100 (hereinafter "system") for coding video data based on predicting sign values of transform coefficients of the video data. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 8 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 9 and 10. The server computer 114 may also be located in a cloud computing deployment model, such as a private cloud, community cloud, public cloud, or hybrid cloud.

The server computer 114, which may be used for coding video data is enabled to run a Video Coding Program 116 (hereinafter "program") that may interact with a database 112. The Video Coding Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger video coding program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
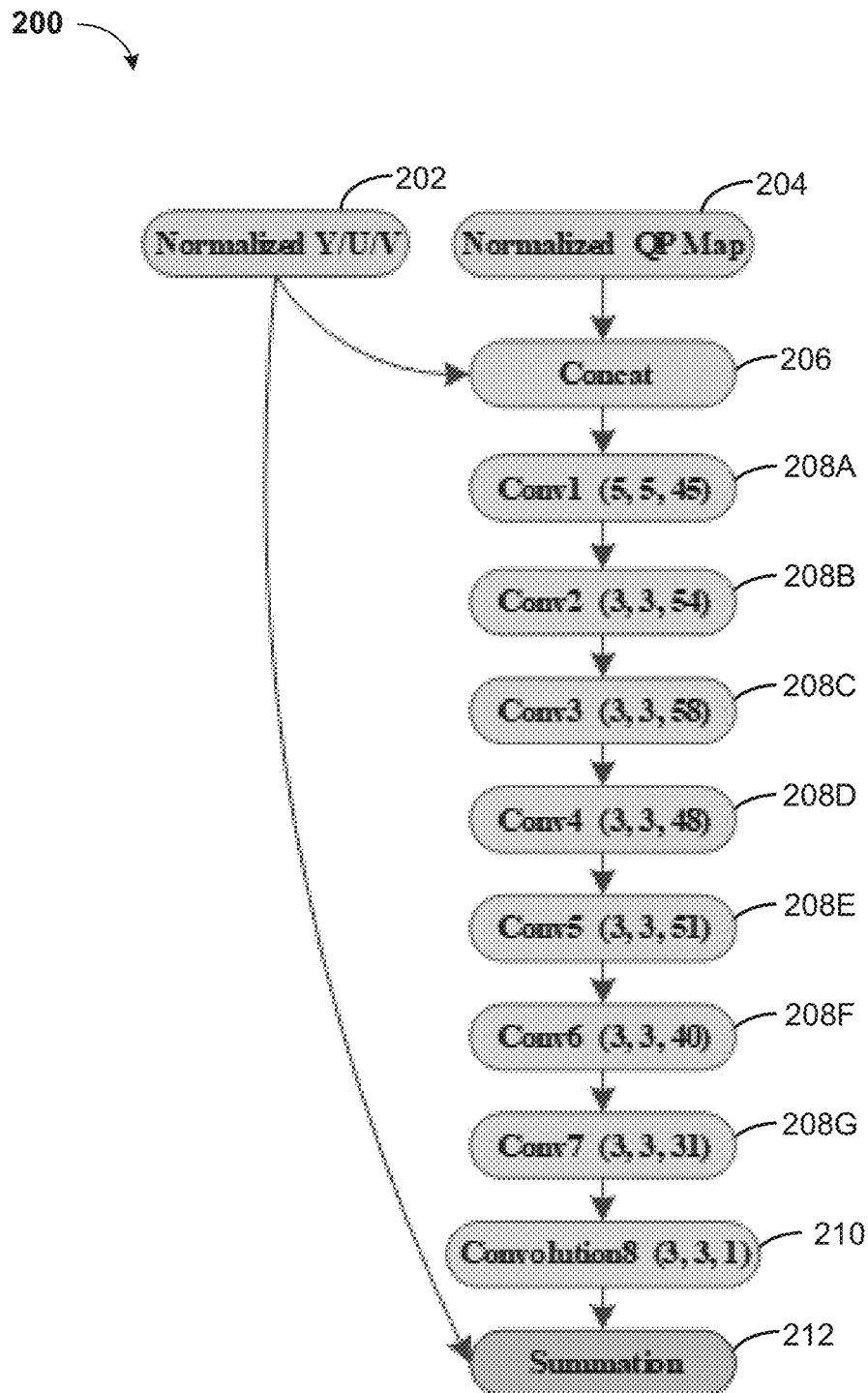
FIG. 2 is a diagram of an exemplary convolutional neural network, according to at least one embodiment.

Referring now to FIG. 2, an exemplary convolutional neural network 200 is depicted. By way of example and not of limitation, a neural network architecture is depicted herein. However, it may be appreciated that substantially any neural network architecture having layers different than the example depicted herein may be used. The convolutional neural network 200 may receive, among other things, two inputs: a reconstruction parameter 202 and a quantization parameter (QP) 204, which may make it possible to use a single set of parameters to adapt to reconstructions with different qualities. Both inputs may be normalized for better convergence in a training process. To reduce the complexity, a simple CNN with 10 layers may be adopted. It may be composed by one concatenation layer 206, 7 convolution layers 208A-208G with each followed by a rectified linear unit layer, one convolution layer 210 and one summation layer 212. These layers may be connected one by one and form a network. It may be appreciated that the layer parameters above may be included in convolution layer. By connecting the reconstructed Y, U or V values to the summation layer, the network may be regularized to learn characteristics of the residual between reconstruction image and its original one.

According to one or more embodiments, inputs of the neural network may include, among other things, one or more reference samples of a current block and a magnitude (level, or absolute value) of transform coefficient values of the current block. The neural network may output predicted sign values of the transform coefficients. In one embodiment, the reference sample may include reconstructed samples from the spatially neighboring blocks. In another embodiment, the reference sample may include the reconstructed samples specified by motion vectors(s) from reference pictures. In one embodiment, when reconstructed samples specified by motion vectors(s) from multiple reference pictures may be involved, the input to the neural network also involves POC distances. A POC distance generally refers to the POC difference between the current picture and the reference pictures. In one embodiment, the transform coefficients which may be used as the input of the neural network may be the de-quantized transform coefficients. In one embodiment, the output of the neural network may be the predicted sign values for a limited set of transform coefficients. In one example, the limited set of transform coefficients includes the low frequency coefficients. That is, the transform coefficient locates at a pre-defined top left area (e.g., top left 1×1, 2×2, 4×4, 8×8, 16×16) of the coefficient block. In one example, the limited set of transform coefficients includes the first N coefficient along the forward scanning order, wherein N may be a pre-defined number.

In one embodiment, the input of the neural network also includes indicators of the primary transform type (kernel). In one embodiment, the input of the neural network also includes indicators of the secondary transform type or kernel (including whether secondary transform may be applied). In one embodiment, one hypothesis of the sign values may be used to get the estimated reconstructed samples of current block, and the estimated reconstructed samples of current block together with neighboring reconstructed values may be used as the input to the neural network, and the output of the network may be one score, wherein high score means that this hypothesis of sign values has higher chance to be selected by current block, and vice versa. In one embodiment, the number of transform coefficients used as the input to the neural network varies if a secondary transform may be applied. In one example, a smaller number of transform coefficients (<N) in the forward scanning order will be used if a secondary transform may be also applied to the current block According to one or more embodiments, inputs of the neural network may include, among other things, reference samples of the current block and reconstructed (or residual) samples of the current block generated using at least one of the hypotheses of the sign values. The neural network may output predicted sign values of transform coefficient. In one embodiment, for the reconstructed (or residual) samples of the current block generated using at least one of the hypothesis of the sign values, which may be used as the input to the neural network, only a subset of the reconstructed (or residual) samples of the current block may be used. The subset may include boundary samples of the current block, such as the top M rows and/or left N columns. Example values of M and N may include 1, 2, 3 and 4. The values of M and N may depend on coded information, such as block size. For different primary transform types and/or secondary transform types, different neural network may be applied for predicting the coefficient sign values.

Figure 3:
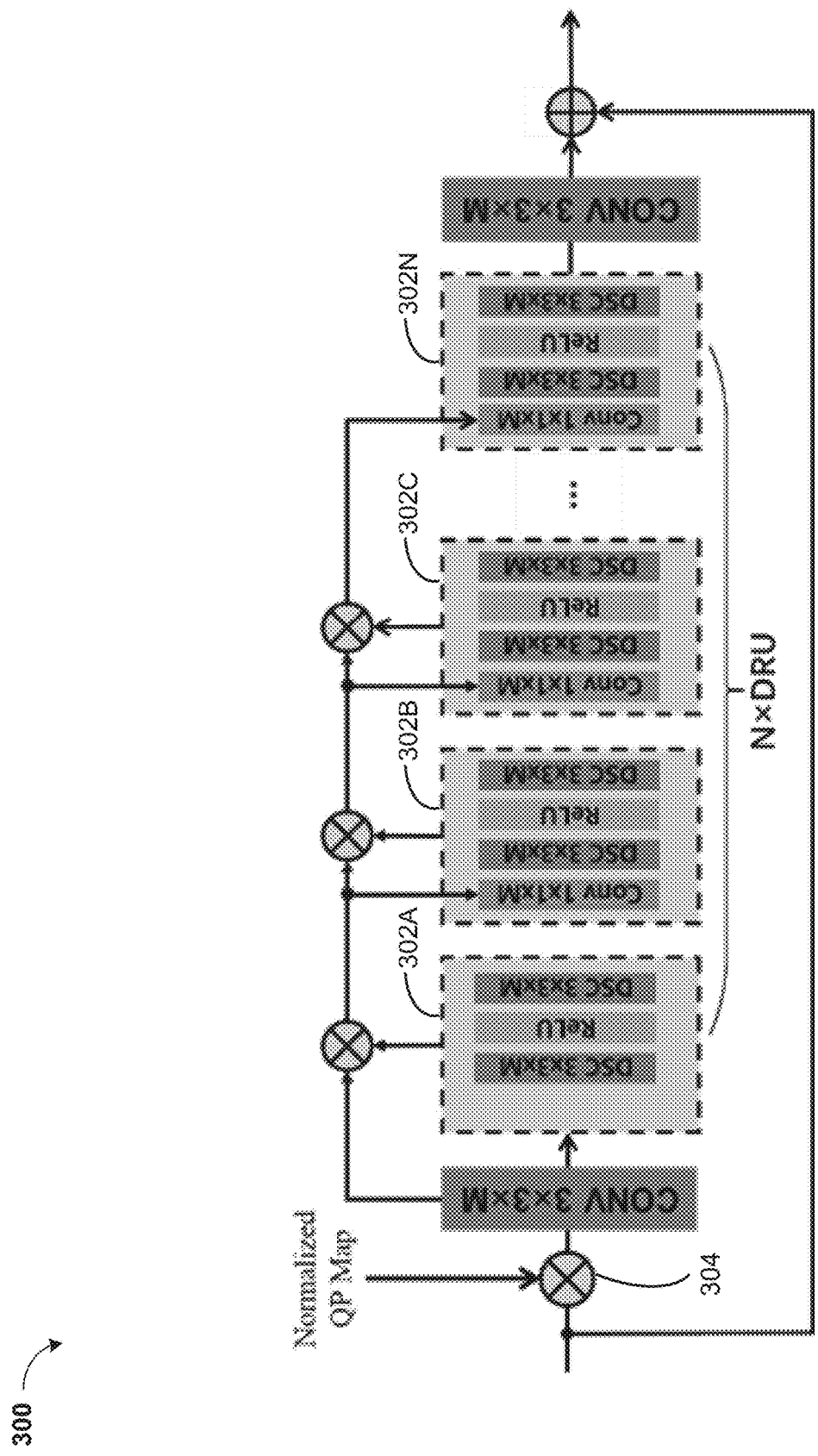
FIG. 3 is a structural block diagram of a dense residual network, according to at least one embodiment.

Referring now to FIG. 3, a structural block diagram of an exemplary dense residual network (DRN) 300 is depicted. The network structure may include N dense residual units (DRUs) 302A-302N, and M may denote a number of convolution kernels. For example, N may be set to 4 and M may be set to 32 as a tradeoff between computational efficiency and performance. A normalized QP map 304 may be concatenated with the reconstructed frame as an input to the DRN 300.

Figure 4:
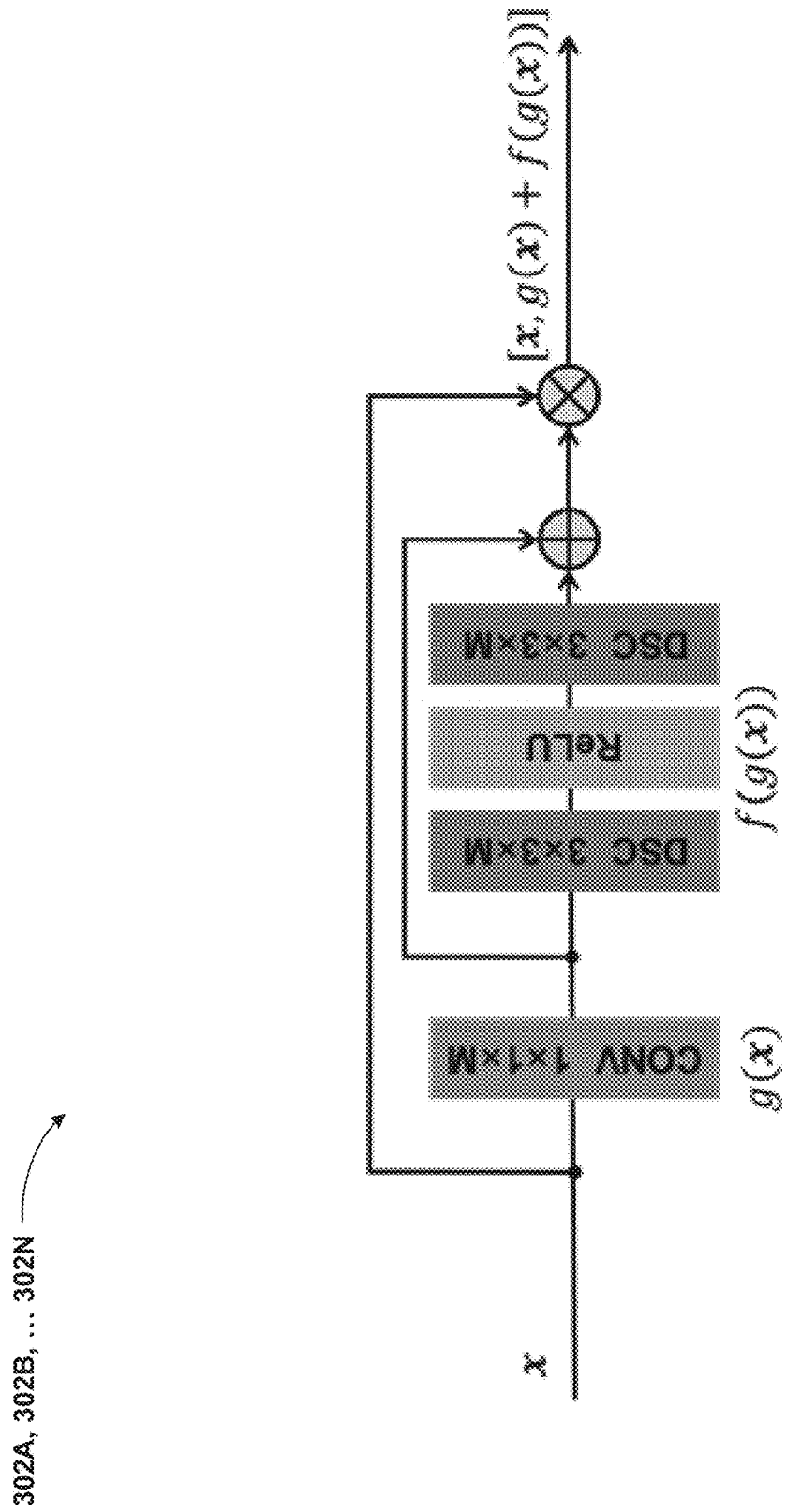
FIG. 4 is a structural block diagram of a dense residual unit of FIG. 3, according to at least one embodiment.

Referring now to FIG. 4, a structural block diagram of DRUs 302A, 302B, . . . , 302N of FIG. 3 is depicted. The DRUs may directly propagate an input to a subsequent unit through a shortcut. To further reduce the computational cost, a 3×3 depth-wise separable convolutional (DSC) layer is applied in the DRU. The output of the network may have 3 channels, which may corresponds to Y, Cb, Cr, respectively. A filter may be applied for both intra and inter pictures. An additional flag may be signaled for each CTU to indicate an on/off status of the DRNLF.

Figure 5A:
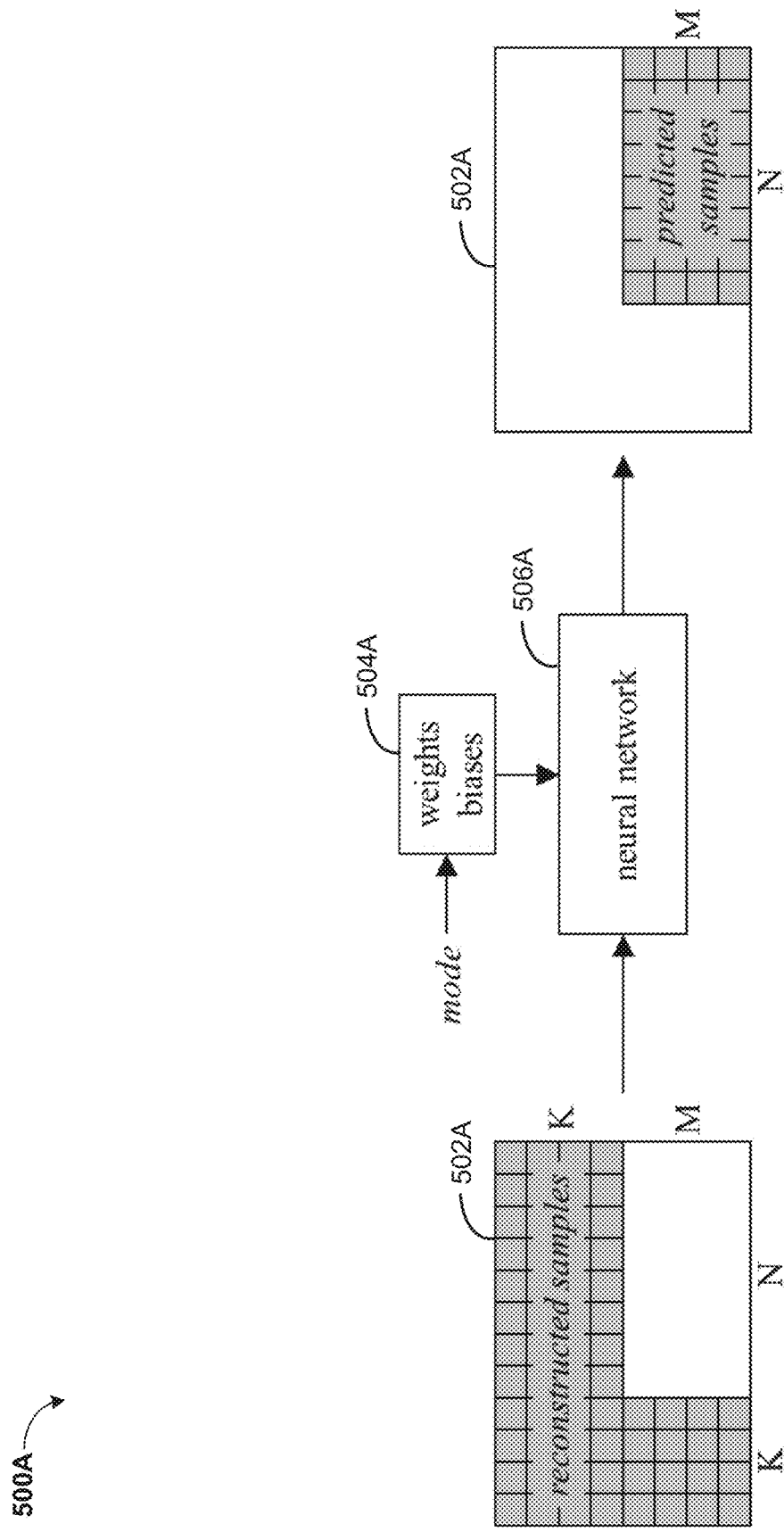
FIGS. 5A and 5B are intra prediction modes, according to at least one embodiment.
Figure 5B:
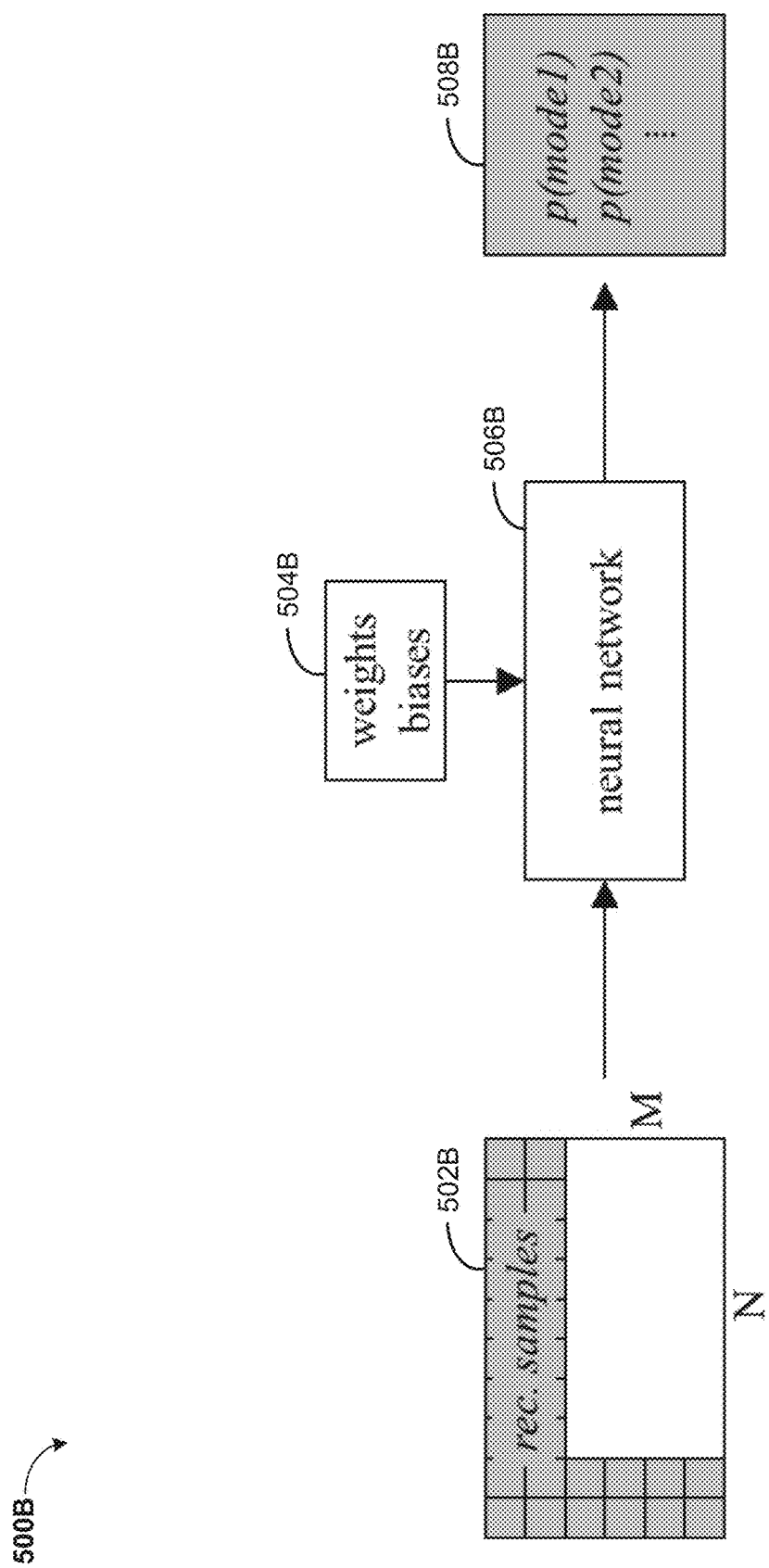

Referring now to FIGS. 5A and 5B, diagrams of intra prediction modes 500A and 500B are depicted. Intra prediction modes may be used to generate an intra-picture prediction signal on a rectangular block in a future video codec. These intra prediction modes perform the following two main steps. A set of features is extracted from the decoded samples. These features are used to select an affine linear combination of predefined image patterns as the prediction signal. Additionally, a specific signalization scheme may be used for the intra-prediction modes.

On a given M×N block 502A with M≤32 and N≤32, the generation of a luma prediction signal pred is performed by processing a set of reference samples r through a neural network 506A. The reference samples r consist of K rows of size N+K above and K columns of size M left of the block 502A. The number K may depend on M and N. For example, K may be set to 2 for all M and N.

The neural network 506A first extracts a vector ftr of features from the reconstructed samples r as follows. If $d_0=K*(N+M+K)$ denotes the number of samples of r, then r is regarded as a vector in the real vector space of dimension $d_0$. For fixed integral square-matrices $A_1$ and $A_2$ which have do rows resp. columns and for fixed integral bias vectors $b_1$ and $b_2$ of dimension do one first computes $t_1=\rho(A_1 \cdot r+b_1)$.

Here, • denotes the ordinary matrix-vector product. Moreover, the function ρ is an integer-approximation of the ELU function $\rho_0$, where the latter function is defined on a p-dimensional vector v by putting $$\rho_0(v)_i = \begin{cases} v_i, & \text{if } v_i > 0 \\ \exp(v_i) - 1, & \text{else,} \end{cases}$$

where $\rho_0(v)_i$ and $v_i$ denote the i-th component of the vectors. One applies similar operations to $t_1$ and computes $$t_2=\rho(A_2 \cdot t_1+b_2).$$

For a fixed integer $d_1$ with $0 \leq d_1 \leq d_0$, there may be a predefined integral matrix $A_3$ with $d_1$ rows and $d_0$ columns and one or more bias weights 504A, such as a predefined integral bias vector $b_3$ of dimension $d_1$ such that one computes the feature vector ftr as $$ftr = \rho(A_3 \cdot t_2 b_3).$$

The value of $d_1$ depends on M and N. At the moment, one puts $d_1 = d_0$.

Out of the feature vector ftr, the final prediction signal pred is generated using an affine linear map followed by the standard Clipping operation Clip that depends on the bit-depth. Thus, there is a predefined matrix $A_4$ with M*N rows and $d_1$ columns and a predefined bias vector $b_4$ of dimension M*N such that one computes $$pred = Clip(A_4 \cdot ftr + b_4).$$

Referring now to FIG. 5B, n different intra prediction modes 508B may be used, where n is set to 35 for max(M, N)<32 and to 11 else. Thus, an index predmode with 0≤predmode<n is to be signaled by an encoder and to be parsed by a decoder and the following syntax may bs used. One has $n = 3 + 2^k$, where k=3 if max(M,N)=32 and k=5, else. In a first step, an index predIdx with 0≤predIdx<n is signaled using the following code. First, one bin encodes whether predIdx<3 or not. If predIdx<3, a second bin encodes if predIdx=0 or not, and, if predIdx≠0, another bin encodes whether predIdx is equal to 1 or 2. If predIdx≥3 then the value of predIdx is signaled in the canonical way using k bins.

From the index predIdx, the actual index predmode is derived using a fully connected neural network 506B with one hidden layer that has the reconstructed samples r' on the two rows of size N+2 above and the two columns of size M left of the block 502B as input.

The reconstructed samples r' are regarded as a vector in the real vector space of dimension 2*(M+N+2). There is a fixed square-matrix $A_1'$ which has 2*(M+N+2) rows resp. columns and there may be one or more bias weights 504B, such as a fixed bias vector $b_1'$ in the real vector space of dimension 2*(M+N+2) such that one computes $$t_1' = \rho(A_1' \cdot r' + b_1').$$

There may exist a matrix $A_2'$ which has n rows and 2*(M+N+2) columns and there is a fixed bias vector $b_2'$ in the real vector space of dimension n such that one computes $$lgt = A_2' \cdot t_1' + b_2'.$$

The index predmode is now derived as being the position of the predIdx-th largest component of lgt. Here, if two components $(lgt)_k$ and $(lgt)_l$ are equal for k≠l, $(lgt)_k$ is regarded as larger than $(lgt)_l$ if k<l and $(lgt)_l$ is regarded as larger than $(lgt)_k$, else.

Figure 6:
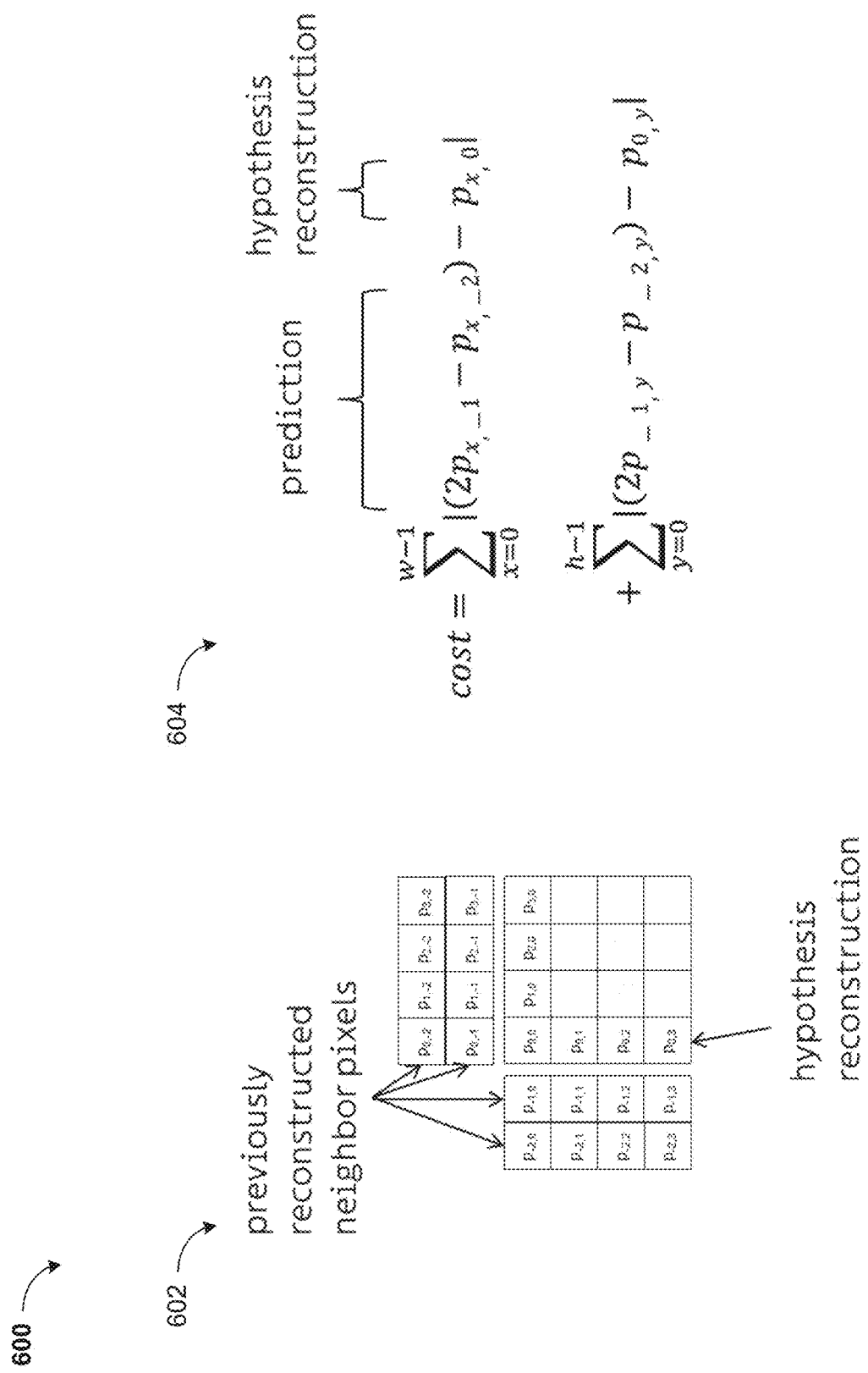
FIG. 6 is a cost calculation, according to at least one embodiment.

Referring now to FIG. 6, exemplary cost calculation 600 is depicted. For entropy coding of transform coefficients, coefficient signs are typically coded separately from the magnitude/level (absolute value of coefficient value) using bypass mode. That means each coefficient sign costs one bit to code, which is costly. To improve the entropy coding efficiency of coefficient signs, a sign prediction method may be used. Instead of signaling the sign values, a flag indicating whether the predicted sign is same with actual sign is entropy coded using context. The context value depends on the level (absolute value of coefficient value) of the coefficient since a larger level value leads to more accurate predicted sign values.

First, a group of transform coefficients are identified such that the associated signs need to be predicted. Then a set of hypotheses for the predicted sign values of these coefficients are created. For example, for three coefficients, the number of hypotheses can be up to 8 (2^3). To predict the sign values, there is a cost value associated with each hypothesis and the hypothesis with minimum cost is used to specify the predicted sign values for the coefficients covered by the hypothesis.

The cost for each hypothesis is calculated as follows. A reconstruction block associated with the given hypothesis is generated following the normal reconstruction process (dequantization, inverse transform), and the boundary samples of the reconstructed block 602, i.e., $p_{0,y}$ and $p_{x,0}$, are derived. For each reconstructed pixel $p_{0,y}$ at the left boundary of the reconstructed block 602, a simple linear prediction using the two pixels to the left is performed to get its prediction $pred_{0,y} = (2p_{-1,y} - p_{-2,y})$. The absolute difference between this prediction and the reconstructed pixel $p_{0,y}$ is added to the cost equation 604 of the hypothesis. Similar processing occurs for pixels in the top row of the reconstructed block, summing the absolute differences of each prediction $pred_{x,0} = (2p_{x,-1} - p_{x,-2})$ and reconstructed pixel $p_{x,0}$.

Figure 7:
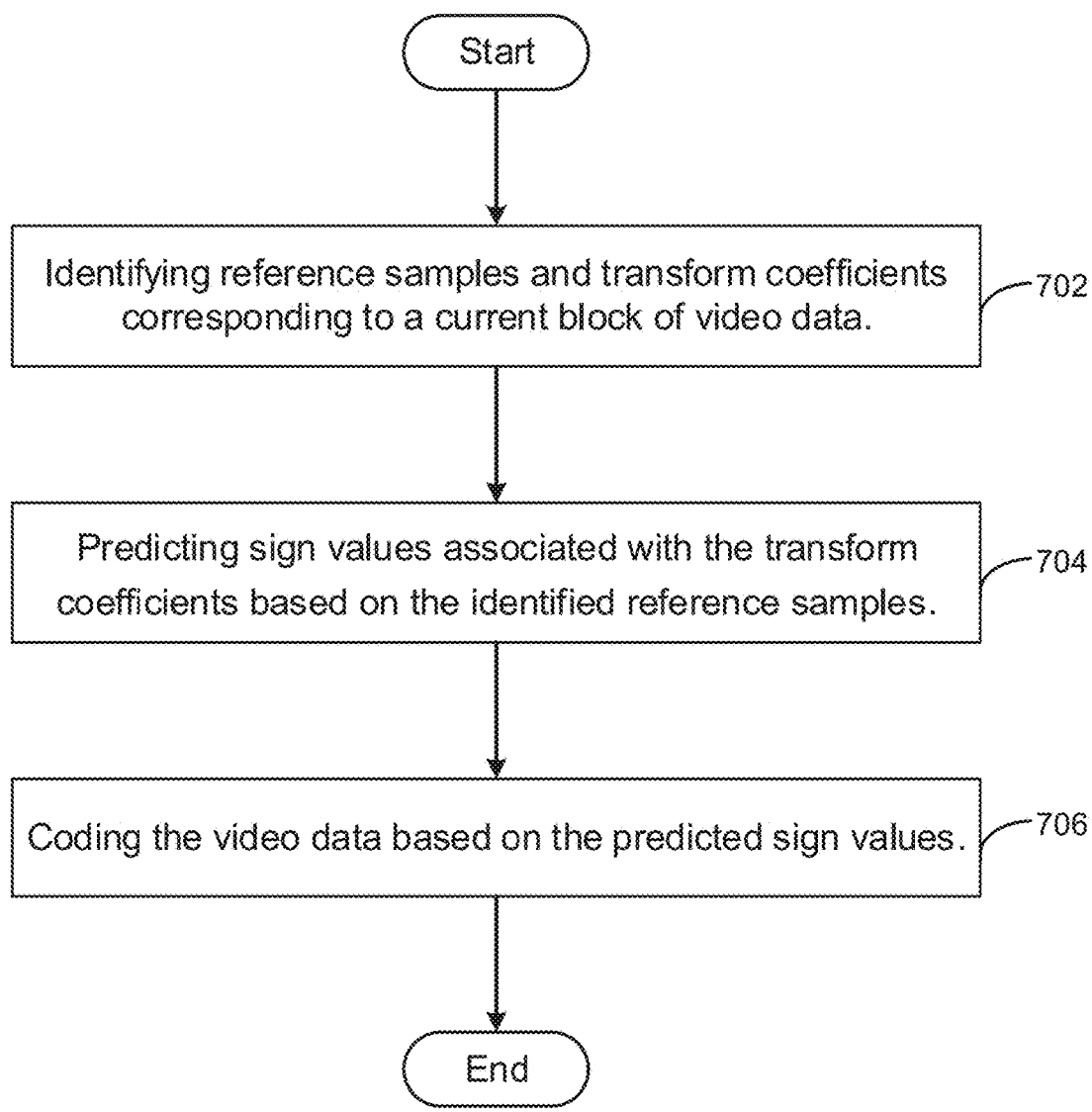
FIG. 7 is an operational flowchart illustrating the steps carried out by a program that codes video data, according to at least one embodiment.

Referring now to FIG. 7, an operational flowchart illustrating the steps of a method 700 for coding video data is depicted. In some implementations, one or more process blocks of FIG. 7 may be performed by the computer 102 (FIG. 1) and the server computer 114 (FIG. 1). In some implementations, one or more process blocks of FIG. 7 may be performed by another device or a group of devices separate from or including the computer 102 and the server computer 114.

At 702, the method 700 includes identifying reference samples and magnitudes of transform coefficients corresponding to a current block of video data from an input to a neural network.

At 704, the method 700 includes predicting sign values associated with the transform coefficients based on the identified reference samples.

At 706, the method 700 includes coding the video data based on the predicted sign values.

It may be appreciated that FIG. 7 provides only an illustration of one implementation and does not imply any limitations with regard to how different embodiments may be implemented. Many modifications to the depicted environments may be made based on design and implementation requirements.

Figure 8:
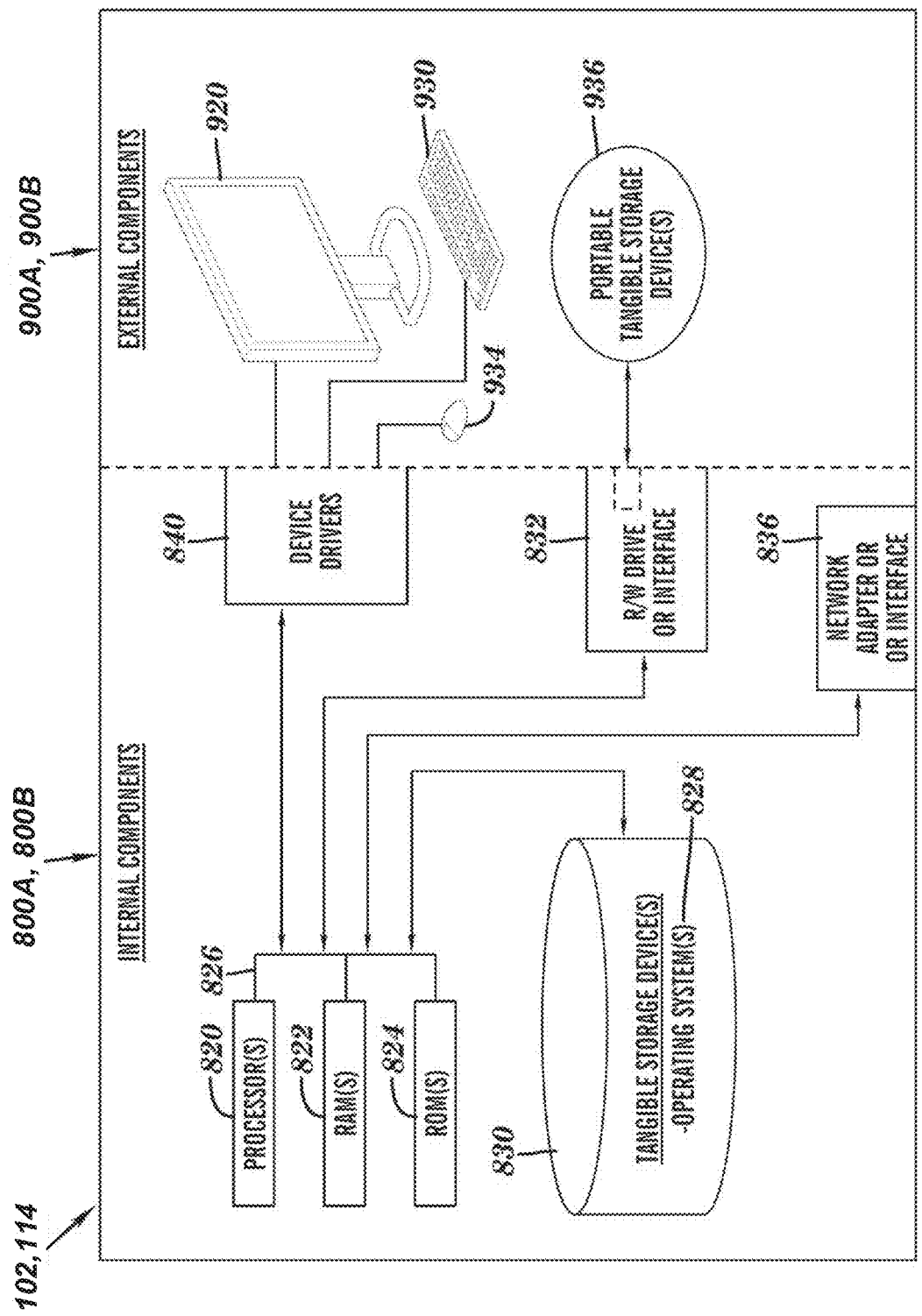
FIG. 8 is a block diagram of internal and external components of computers and servers depicted in FIG. 1 according to at least one embodiment.

FIG. 8 is a block diagram of internal and external components of computers 102, 114 depicted in FIG. 1 in accordance with an illustrative embodiment. It should be appreciated that FIG. 8 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 8. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Video Coding Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Video Coding Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Video Coding Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Video Coding Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
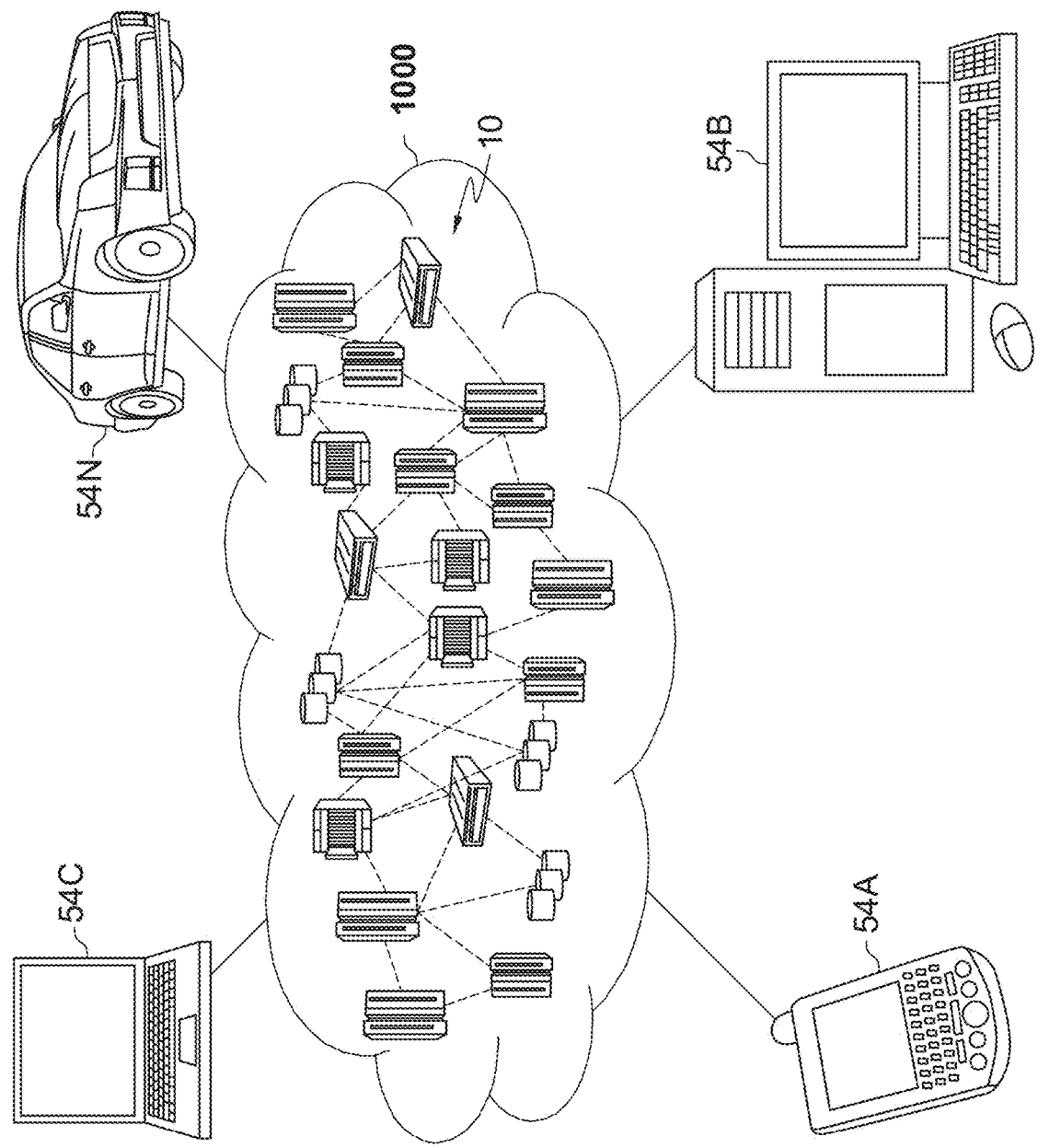
FIG. 9 is a block diagram of an illustrative cloud computing environment including the computer system depicted in FIG. 1, according to at least one embodiment.

Referring to FIG. 9, illustrative cloud computing environment 1000 is depicted. As shown, cloud computing environment 1000 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 54A-N shown in FIG. 9 are intended to be illustrative only and that cloud computing nodes 10 and cloud computing environment 1000 can communicate with any type of computerized device over any type of network and/or network addressable connection (e.g., using a web browser).

Figure 10:
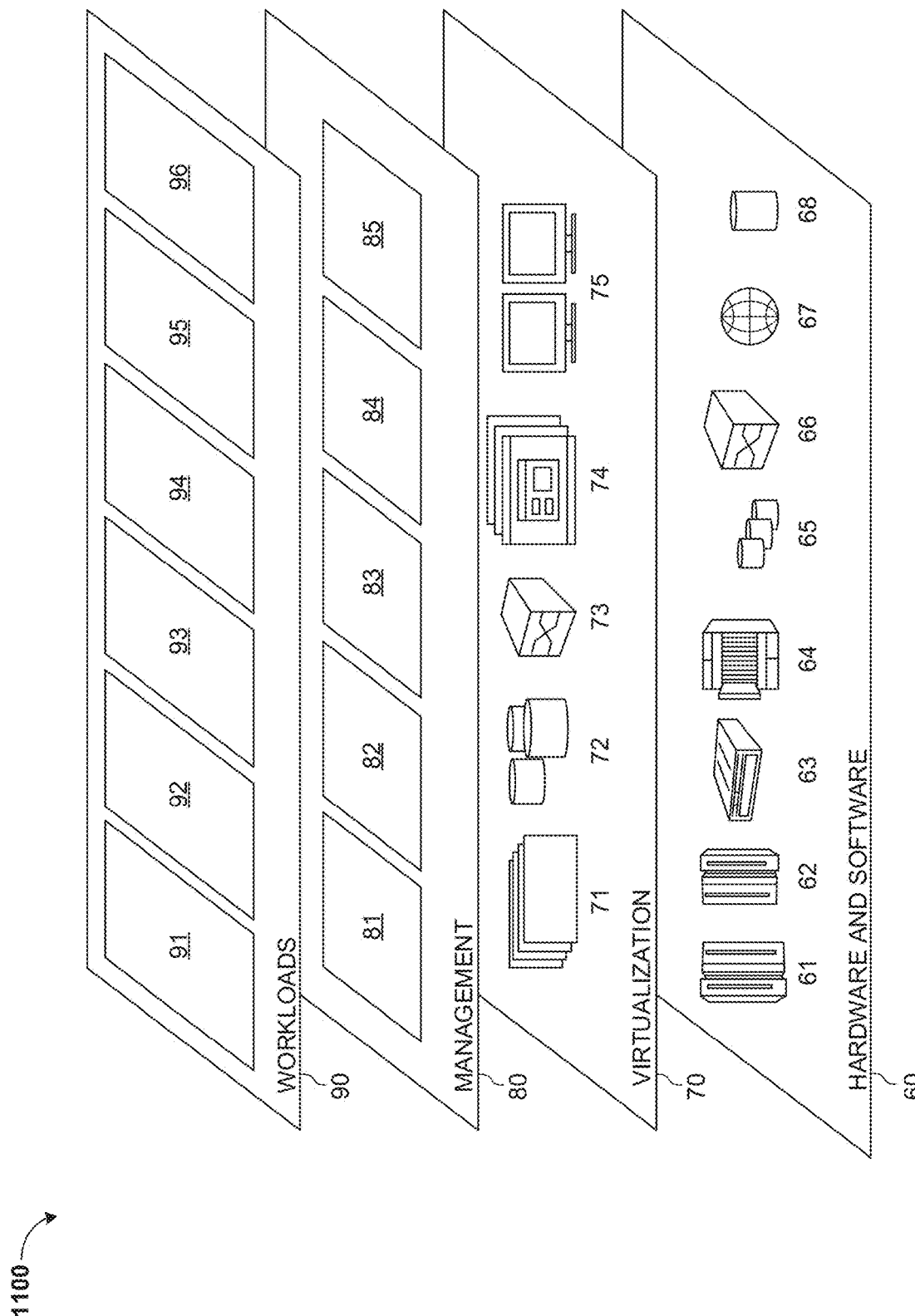
FIG. 10 is a block diagram of functional layers of the illustrative cloud computing environment of FIG. 9, according to at least one embodiment.

Referring to FIG. 10, a set of functional abstraction layers 1100 provided by cloud computing environment 1000 (FIG. 9) is shown. It should be understood in advance that the components, layers, and functions shown in FIG. 10 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Video Coding 96. Video Coding 96 may code video data based on predicting sign values of transform coefficients of the video data.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of video coding, executable by a processor, the method comprising:
identifying reference samples and magnitudes of transform coefficients corresponding to a current block of video data from inputs to a neural network, the inputs including a quantization parameter, a reconstruction parameter, and at least one POC distance;
extracting a set of features from the reference samples, wherein the extracting includes performing an integer-approximation of an ELU function;
predicting sign values associated with the transform coefficients based at least on the identified reference samples and the set of features; and
coding the video data based on the predicted sign values.

2. The method of claim 1, wherein the reference samples comprise reconstructed samples from spatially neighboring blocks corresponding to the current block.

3. The method of claim 1, wherein the reference samples include reconstructed samples specified by motion vectors associated with a reference image from the video data.

4. The method of claim 1, wherein the transform coefficients are de-quantized transform coefficients.

5. The method of claim 1, wherein the predicted sign values correspond to a limited set of transform coefficients.

6. The method of claim 5, wherein the limited set of transform coefficients comprises low frequency coefficients at a pre-defined top left area of the current block.

7. The method of claim 5, wherein the limited set of transform coefficients comprises a pre-defined number of coefficients along a forward scanning order.

8. The method of claim 1, wherein the sign values are predicted using a convolutional neural network.

9. The method of claim 8, wherein based on reconstructed samples being associated with a current image and/or multiple reference images, a phase-only correlation difference between a current image and the reference images is used as an input to the convolutional neural network.

10. The method of claim 8, wherein indicators of a primary transform type or kernel are an input to the convolutional neural network.

11. The method of claim 10, wherein indicators of a secondary transform type or kernel are an input to the convolutional neural network.

12. The method of claim 8, further comprising obtaining estimated reconstructed samples of the current block based on a candidate of the predicted sign values, wherein the estimated reconstructed samples of the current block and neighboring reconstructed values are inputs to the convolutional neural network.

13. The method of claim 12, wherein score values associated with the predicted sign values are outputs of the convolutional neural network, and wherein a sign value is selected from among the predicted sign values by the current block based on the score values.

14. The method of claim 8, wherein a number of transform coefficients used as an input to the convolutional neural network varies based on a secondary transform being applied.

15. The method of claim 14, wherein a number of transform coefficients in a forward scanning order less than a pre-defined number of coefficients are used based on the secondary transform being applied to the current block.

16. The method of claim 1, wherein a subset of reconstructed samples of the current block is used based on the predicted sign values.

17. The method of claim 16, wherein the subset of reconstructed samples includes boundary samples of current block.

18. The method of claim 17, wherein the boundary samples comprise a first pre-determined number of top rows of the current block and a second pre-determined number of left columns of the current block, and the first and the second pre-determined numbers are based on a size associated with the current block.

19. A computer system for coding video data, the computer system comprising:
one or more computer-readable non-transitory storage media configured to store computer program code; and
one or more computer processors configured to access the computer program code stored in the one or more computer-readable non-transitory storage media and operate as instructed by the computer program code, the computer program code including:
identifying code configured to cause the one or more computer processors to identify reference samples and magnitudes of transform coefficients corresponding to a current block of video data from inputs to a neural network, the inputs including a quantization parameter, a reconstruction parameter, and at least one POC distance;
extracting code configured to cause the one or more computer processors to extract a set of features from the reference samples, wherein the extracting includes performing an integer-approximation of an ELU function;
predicting code configured to cause the one or more computer processors to predict sign values associated with the transform coefficients based on at least the identified reference samples and the set of features; and
coding code configured to cause the one or more computer processors to code the video data based on the predicted sign values.

20. A non-transitory computer readable medium storing a computer program for coding video data, the computer program configured to cause one or more computer processors to at least:
identify reference samples and magnitudes of transform coefficients corresponding to a current block of video data from inputs to a neural network, the inputs including a quantization parameter, a reconstruction parameter, and at least one POC distance;
extract a set of features from the reference samples, wherein the extracting includes performing an integer-approximation of an ELU function;
predict sign values associated with the transform coefficients based on at least the identified reference samples and the set of features; and
code the video data based on the predicted sign values.

* * * * *